(12) United States Patent
Ishioka et al.

(10) Patent No.: US 11,340,612 B2
(45) Date of Patent: May 24, 2022

(54) VEHICLE CONTROL APPARATUS, VEHICLE CONTROL METHOD, VEHICLE, AND STORAGE MEDIUM

(71) Applicant: HONDA MOTOR CO., LTD., Tokyo (JP)

(72) Inventors: Atsushi Ishioka, Wako (JP); Tadahiko Kanoh, Wako (JP); Kanta Tsuji, Wako (JP); Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 16/775,738

(22) Filed: Jan. 29, 2020

(65) Prior Publication Data

US 2020/0257294 A1 Aug. 13, 2020

(30) Foreign Application Priority Data

Feb. 8, 2019 (JP) .............................. JP2019-021804

(51) Int. Cl.
*G05D 1/00* (2006.01)
*B60W 30/18* (2012.01)

(52) U.S. Cl.
CPC ..... *G05D 1/0088* (2013.01); *B60W 30/18163* (2013.01); *B60W 2420/42* (2013.01); *B60W 2420/52* (2013.01); *B60W 2520/10* (2013.01); *B60W 2540/215* (2020.02); *B60W 2554/406* (2020.02); *B60W 2556/10* (2020.02); *B60W 2720/10* (2013.01)

(58) Field of Classification Search
CPC .............. G05D 1/0088; G05D 1/0214; B60W 30/18163; B60W 2520/10; B60W 2720/10; B60W 2420/52; B60W 2556/10; B60W 2554/406; B60W 2420/42; B60W 2540/215; B60W 2556/50; B60W 2540/10; B60W 50/14; G08G 1/16; G08G 1/09623; G08G 1/09626; G08G 1/166

USPC ........ 701/27, 58, 70, 93, 96; 700/12, 13, 90, 700/255

See application file for complete search history.

(56) References Cited

U.S. PATENT DOCUMENTS

| 10,501,084 B2 | 12/2019 | Sugawara et al. |
| 2002/0133285 A1* | 9/2002 | Hirasago ................ B60K 35/00 |
| | | 701/96 |
| 2017/0261989 A1* | 9/2017 | Ishioka ................ G05D 1/0212 |
| 2017/0313323 A1* | 11/2017 | Tseng ................ B60W 50/0098 |

(Continued)

FOREIGN PATENT DOCUMENTS

JP 2016-126360 A 7/2016

*Primary Examiner* — Elaine Gort
*Assistant Examiner* — Ellis B. Ramirez
(74) *Attorney, Agent, or Firm* — Thomas|Horstemeyer, LLP

(57) ABSTRACT

A vehicle control apparatus that controls a vehicle based on a plurality of control states, includes a detection unit configured to detect information of the vehicle and peripheral information of the vehicle and a vehicle control unit configured to control the vehicle based on a detection result of the detection unit. In a case in which the vehicle control unit can execute, based on the detection result of the detection unit, a first control state and a second control state, the vehicle control unit controls the vehicle by selecting a control state prioritizing one of the first control state and the second control state in an overlapping operation condition range.

25 Claims, 7 Drawing Sheets

(56) References Cited

U.S. PATENT DOCUMENTS

2017/0341652 A1   11/2017  Sugawara et al.
2019/0311207 A1*  10/2019  Oniwa ................ B60W 30/146
2021/0279484 A1*   9/2021  Mori .................. G06K 9/00798

* cited by examiner

FIG. 6

| ROUTE | DRIVER | LANE CHANGE HISTORY (ALC-SW SETTING) |
|---|---|---|
| R1 | A | ON |
| | B | OFF |
| R2 | A | ON |
| | C | OFF |
| R3 | B | ON |
| | C | OFF |

VEHICLE CONTROL APPARATUS, VEHICLE CONTROL METHOD, VEHICLE, AND STORAGE MEDIUM

CROSS-REFERENCE TO RELATED APPLICATION(S)

This application claims priority to and the benefit of Japanese Patent Application No. 2019-021804 filed on Feb. 8, 2019, the entire disclosure of which is incorporated herein by reference.

BACKGROUND OF THE INVENTION

Field of the Invention

The present invention relates to a vehicle control apparatus, a vehicle control method, a vehicle, and a storage medium, and more specifically, a vehicle control technique of an automated-driving vehicle.

Description of the Related Art

Japanese Patent Laid-Open No. 2016-126360 discloses an arrangement in which a vehicle uses a sensor to detect a distance from a following vehicle traveling on a lane which is the lane change destination of the self-vehicle, and makes a lane change in a case in which a distance detected by the sensor is greater than a distance detected by another sensor necessary to make the lane change.

However, in a case in which a plurality of control states are executable, vehicle control needs to be performed by prioritizing one of the control states.

The present invention solves at least the problem described above and provides a vehicle control technique that performs vehicle control by prioritizing and selecting one control state in a case in which a plurality of control states are executable.

SUMMARY OF THE INVENTION

According to one aspect of the present invention, there is provided a vehicle control apparatus that controls a vehicle based on a plurality of control states, comprising: a detection unit configured to detect information of the vehicle and peripheral information of the vehicle; and a vehicle control unit configured to control the vehicle based on a detection result of the detection unit, wherein in a case in which the vehicle control unit can execute, based on the detection result of the detection unit, a first control state in which vehicle control can be performed in a travel lane of the vehicle in a first operation condition range for operating vehicle control and a second control state in which vehicle control can be performed in the travel lane and vehicle control to make a lane change from the travel lane to an adjacent lane can be performed in a second operation condition range whose operation condition range partially overlaps the first operation condition range, the vehicle control unit controls the vehicle by selecting, based on a setting of the driver, a control state prioritizing one of the first control state and the second control state in the overlapping operation condition range.

According to another aspect of the present invention, there is provided a vehicle control apparatus that controls a vehicle based on a plurality of control states, comprising: a detection unit configured to detect information of the vehicle and peripheral information of the vehicle; and a vehicle control unit configured to control the vehicle based on the detection result of the detection unit, wherein in a case in which the vehicle control unit can execute, based on the detection result of the detection unit, a first control state in which vehicle control can be performed in a travel lane of the vehicle in a first operation condition range for operating vehicle control and a second control state in which vehicle control can be performed in the travel lane and vehicle control to make a lane change from the travel lane to an adjacent lane can be performed in a second operation condition range whose operation condition range partially overlaps the first operation condition range, the vehicle control unit controls the vehicle by selecting, based on a driving state of the vehicle, a control state prioritizing one of the first control state and the second control state in the overlapping operation condition range.

According to still another aspect of the present invention, there is provided a vehicle control method of a vehicle control apparatus that controls a vehicle based on a plurality of control states, the method comprising: detecting, by a detection unit, information of the vehicle and peripheral information of the vehicle; and controlling the vehicle based on a detection result of the detection, wherein in a case in which it is possible to execute, in the controlling, based on the detection result in the detecting, a first control state in which vehicle control can be performed in a travel lane of the vehicle in a first operation condition range for operating vehicle control and a second control state in which vehicle control can be performed in the travel lane and vehicle control to make a lane change from the travel lane to an adjacent lane can be performed in a second operation condition range whose operation condition range partially overlaps the first operation condition range, the vehicle is controlled by selecting, based on a setting of the driver, a control state prioritizing one of the first control state and the second control state in the overlapping operation condition range.

According to yet another aspect of the present invention, there is provided a vehicle control method of a vehicle control apparatus that controls a vehicle based on a plurality of control states, the method comprising: detecting, by a detection unit, information of the vehicle and peripheral information of the vehicle; and controlling the vehicle based on the detection result of the detection unit, wherein in a case in which it is possible to execute, in the controlling, based on the detection result in the detecting, a first control state in which vehicle control can be performed in a travel lane of the vehicle in a first operation condition range for operating vehicle control and a second control state in which vehicle control can be performed in the travel lane and vehicle control to make a lane change from the travel lane to an adjacent lane can be performed in a second operation condition range whose operation condition range partially overlaps the first operation condition range, the vehicle is controlled by selecting, based on a driving state of the vehicle, a control state prioritizing one of the first control state and the second control state in the overlapping operation condition range.

According to the present invention, vehicle control can be performed by prioritizing and selecting one control state in a case in which a plurality of control states are executable. For example, in a case in which a first control state and a second control state are executable in the range of overlapping operation conditions, a control state to be prioritized can be selected based on the setting of a driver.

BRIEF DESCRIPTION OF THE DRAWINGS

The accompanying drawings, which constitute a part of the specification, illustrate embodiments of the invention and, together with the description, serve to explain the principles of the invention.

FIG. 6 is a table showing an example of lane change history information stored in a memory.

DESCRIPTION OF THE EMBODIMENTS

Figure 1A:
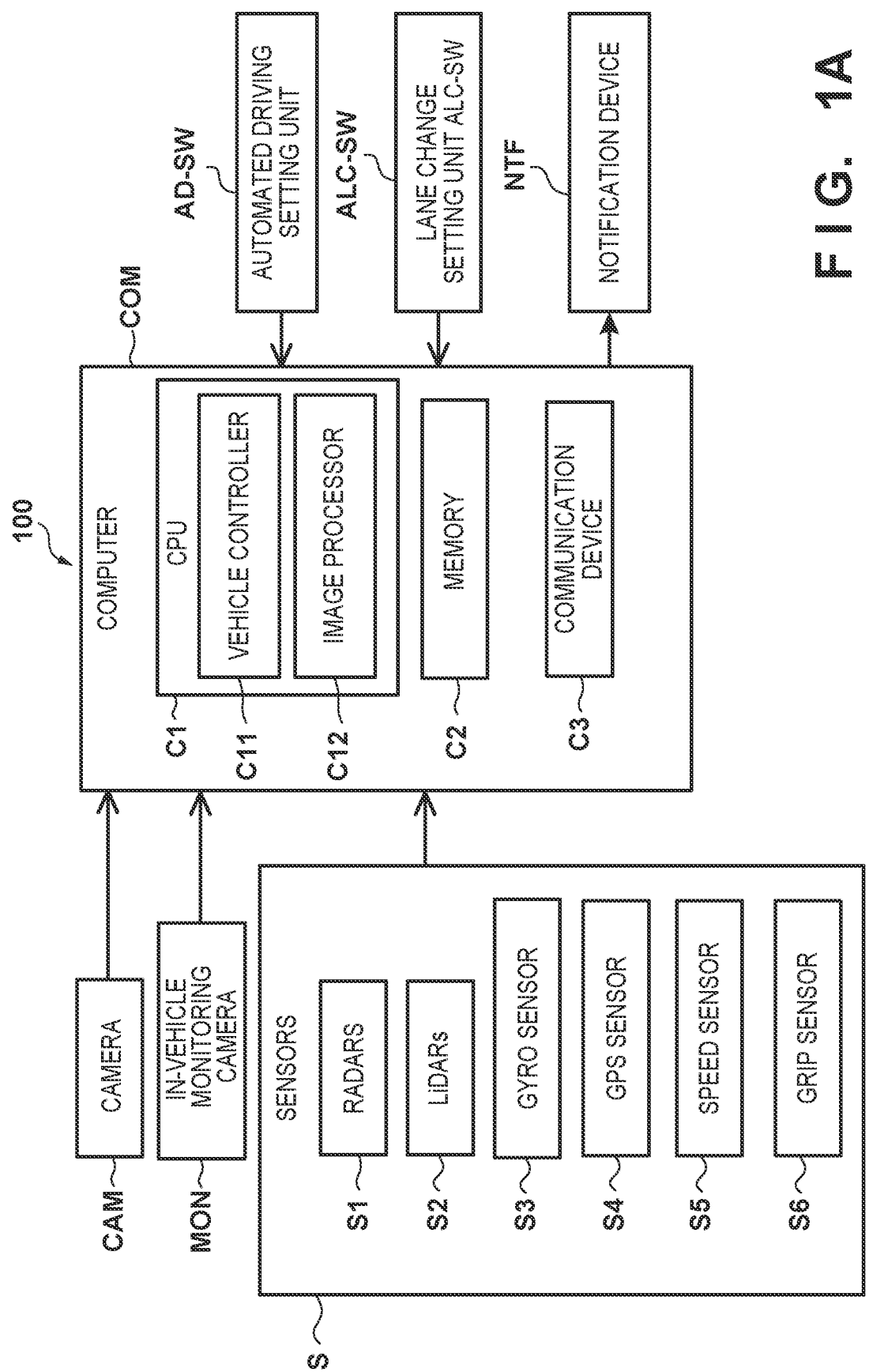
FIG. 1A is a block diagram showing an example of the arrangement of a vehicle control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment (Arrangement of Vehicle Control Apparatus)

FIG. 1A is a block diagram showing an example of the arrangement of a travel control system that includes a vehicle control apparatus 100 for performing automated driving control of a vehicle. The vehicle control apparatus 100 includes sensors S, a camera CAM, an in-vehicle monitoring camera MON, a computer COM, and an automated driving setting unit AD-SW and a lane change setting unit ALC-SW that function as operation input units. The sensors S include, for example, a plurality of radars S1, a plurality of LiDARs (Light Detection and Ranging) S2, a gyro sensor S3, a GPS sensor S4, a speed sensor S5, a grip sensor S6, and the like.

The computer COM also includes a CPU C1 which is in charge of processing related automated driving control of the vehicle, a memory C2, and a communication device C3 which is capable of connecting to a network NET and communicating with a server device on the network, another vehicle positioned in the periphery of the vehicle (self-vehicle), and the like. The sensors S and the camera CAM will obtain various kinds of information of the vehicle and input the obtained information in the computer COM. Also, the communication device C3 will obtain, as operation conditions for performing vehicle control, information related to the travel environment (for example, weather conditions such as the rainfall amount, the snowfall amount, and the like) of the vehicle, and input the obtained information to the computer COM.

The CPU C1 of the computer COM performs image processing on image information input from the camera CAM. The CPU C1 extracts objects present in the periphery of the self-vehicle based on camera image information that has undergone image processing and sensor information input from the sensors S (the radars S1 and the LiDARs S2), analyzes what kind of objects are present in the periphery of the self-vehicle, and monitors the objects.

Based on the various kinds of information input from the sensors S and the camera CAM, the CPU C1 of the computer COM obtains, as operation conditions for controlling the vehicle 1, information such as the conditions (for example, the curvatures of a right curve and a left curve, the gradient, and the like) of the road on which the vehicle is traveling, the lane detection states (for example, the lane detection rate, the lane detection distance, and the like), the detection states (the agreement of the detection results, the stability of the detected state, the reliability of the detection result indicating that the preceding vehicle as the same detection target is being stably detected, and the like) of the preceding vehicle traveling immediately ahead of the vehicle (self-vehicle), the degree of congestion (for example, the number of peripheral vehicles traveling within a predetermined range about the self-vehicle) of the periphery of the vehicle, and the like.

The gyro sensor S3 detects the rotary motion and the orientation of the self-vehicle, and the computer COM can determine the track of the self-vehicle based on the detection result of the gyro sensor S3, the speed detected by the speed sensor S5, and the like. The GPS sensor S4 detects the current position (position information) of the self-vehicle in the map information.

The grip sensor S6 is, for example, incorporated in the steering wheel of the vehicle and can detect whether a vehicle occupant (driver) is gripping the steering wheel. The grip sensor S6 inputs the detected steering wheel grip information to the computer COM. The computer COM can determine, based on the steering wheel grip information input by the grip sensor S6, whether the vehicle occupant (driver) is gripping the steering wheel, that is, whether the steering wheel is currently in a "hands-on" state or a "hands-off" state.

The in-vehicle monitoring camera MON is arranged so as to be capable of capturing an image inside the vehicle, and captures an image of the vehicle occupant. The in-vehicle monitoring camera MON inputs, to the computer COM, the outer appearance information of the captured vehicle occupant. The computer COM can perform image processing on the image of the vehicle occupant input from the in-vehicle monitoring camera MON, and detect the outer appearance information of the vehicle occupant such as the expression, the facial direction, the line of sight, the degree of eye opening/closing, the driving posture, and the like of the vehicle occupant. The computer COM can determine, based on the detected outer appearance information of the vehicle occupant, whether the current driving state of the vehicle occupant (driver) is an "eyes-on" state or an "eyes-off" state.

A notification device NTF includes a voice output device and a display device. The voice output device notifies the driver of information by voice. The display device notifies the driver of information by displaying an image.

The computer COM of the vehicle control apparatus 100 can control the automated driving travel operation of the vehicle by causing the control state of the vehicle to shift sequentially in a plurality of control states based on the information of the peripheral environment of the vehicle. That is, the computer COM obtains peripheral environment information of the vehicle by using the information from the sensors S and the computer COM, shifts the control state of the vehicle based on the peripheral environment information, and controls the automated driving travel operation of the vehicle.

The CPU C1 of the computer COM functions as a vehicle controller C11 and an image processor C12 by executing programs stored in the memory C2. The vehicle controller C11 controls the vehicle based on the detection results of the detection units (the sensors S, the camera CAM, and the like) that detect the information of the vehicle and the peripheral information of the vehicle. A control state, out of the plurality of control states, is used to control the automated driving travel operation of the vehicle. In a case in which there are a plurality of executable control states, the vehicle controller C11 will select the control state to be prioritized from the plurality of control states, and execute vehicle control corresponding to the selected control state. The processing of the vehicle controller C11 will be described in detail later.

The automated driving setting unit AD-SW is a setting unit used to make the ON/OFF setting for executing vehicle control by automated driving. In a case in which the automated driving setting unit AD-SW is set to ON by the vehicle occupant (driver), the vehicle controller C11 will execute vehicle control by automated driving. In a case in which the automated driving setting unit AD-SW has been set to OFF from the start of the operation of the engine, the vehicle controller C11 will not execute vehicle control by automated driving, but execute control by manual driving.

In a case in which the automated driving setting unit AD-SW is set to OFF in the automated driving state, the vehicle controller C11 will make a request (takeover request) to the driver to switch to manual driving control. For example, the vehicle controller will make the display device of the notification device NTF display a message such as "the control state will be switched to manual driving control". Alternatively, this display operation may be combined with a notification method performed by voice, such as an announcement output from the voice output device, so that the driver will be able to notice the message more easily. For example, the vehicle controller C11 can determine that the driver has taken over the driving control in a case in which the steering wheel has been gripped and operated by the driver or in a case in which an acceleration/deceleration operation has been performed by the driver.

On the other hand, in a case in which a predetermined time has elapsed without the execution of an operation as described above after the takeover request, it will be determined that the driver has not taken over the driving control, and the vehicle controller C11 will execute an alternative control operation. For example, the vehicle controller C11 will identify a position where the vehicle can stop safely based on the information of the gyro sensor S3 and the GPS sensor S4, the map information and the traffic information obtained via the communication device C3, and the like, and control the vehicle to stop at the identified position.

The lane change setting unit ALC-SW is a setting unit used to make the ON/OFF setting for executing a lane change operation in the vehicle control. In a case in which the lane change setting unit ALC-SW is set to ON by the driver and the travel environment of the vehicle has changed to a state in which a lane change operation can be performed, the vehicle controller C11 will execute vehicle control to perform a lane change operation.

In a case in which a plurality of controls are executable (for example, in a case in which the lane change operation is executable in one control state but is not executable in the other control state) and the lane change setting unit ALC-SW is set to ON, the vehicle controller C11 will control the vehicle by prioritizing and selecting, as the control state, the control state in which the lane change operation is executable. Setting the lane change setting unit ALC-SW to ON will allow a lane change operation to be triggered and performed based on a signal from the side of the vehicle control apparatus 100 (system) when the travel environment has changed to a lane change executable state. This will allow the intentions and the preferences (for example, the desire to arrive at the destination as soon as possible, the desire to reduce the monitoring load requested of the driver, and the like) of the vehicle occupant (driver) to be reflected to the vehicle control performed in automated driving.

Also, in a case in which the lane change setting unit ALC-SW is set to OFF, the vehicle controller C11 will not perform a lane change operation based on a signal that serves as a trigger from the vehicle control apparatus 100 (system). A more specific example of the shifting (selection) of the control state in a case in which the lane change setting unit ALC-SW is set to ON or OFF will be described later with reference to FIG. 5.

In a case in which the vehicle is to incorporate the vehicle control apparatus 100 shown in FIG. 1A, the computer COM may be arranged in, for example, an ECU of recognition processing system that processes information of the sensors S, the camera CAM, the in-vehicle monitoring camera MON, an ECU of an image processing system, an ECU for controlling a communication device and an input/output device, an ECU in a control unit that executes vehicle driving control, and an ECU for automated driving. For example, as shown in FIG. 1B to be described below, the function of the computer COM may be distributed among a plurality of ECUs that form the vehicle control apparatus 100 such as the ECUs of the sensors S, the ECUs of the cameras, the ECU of the input/output device, the ECU for automated driving, and the like.

Figure 1B:
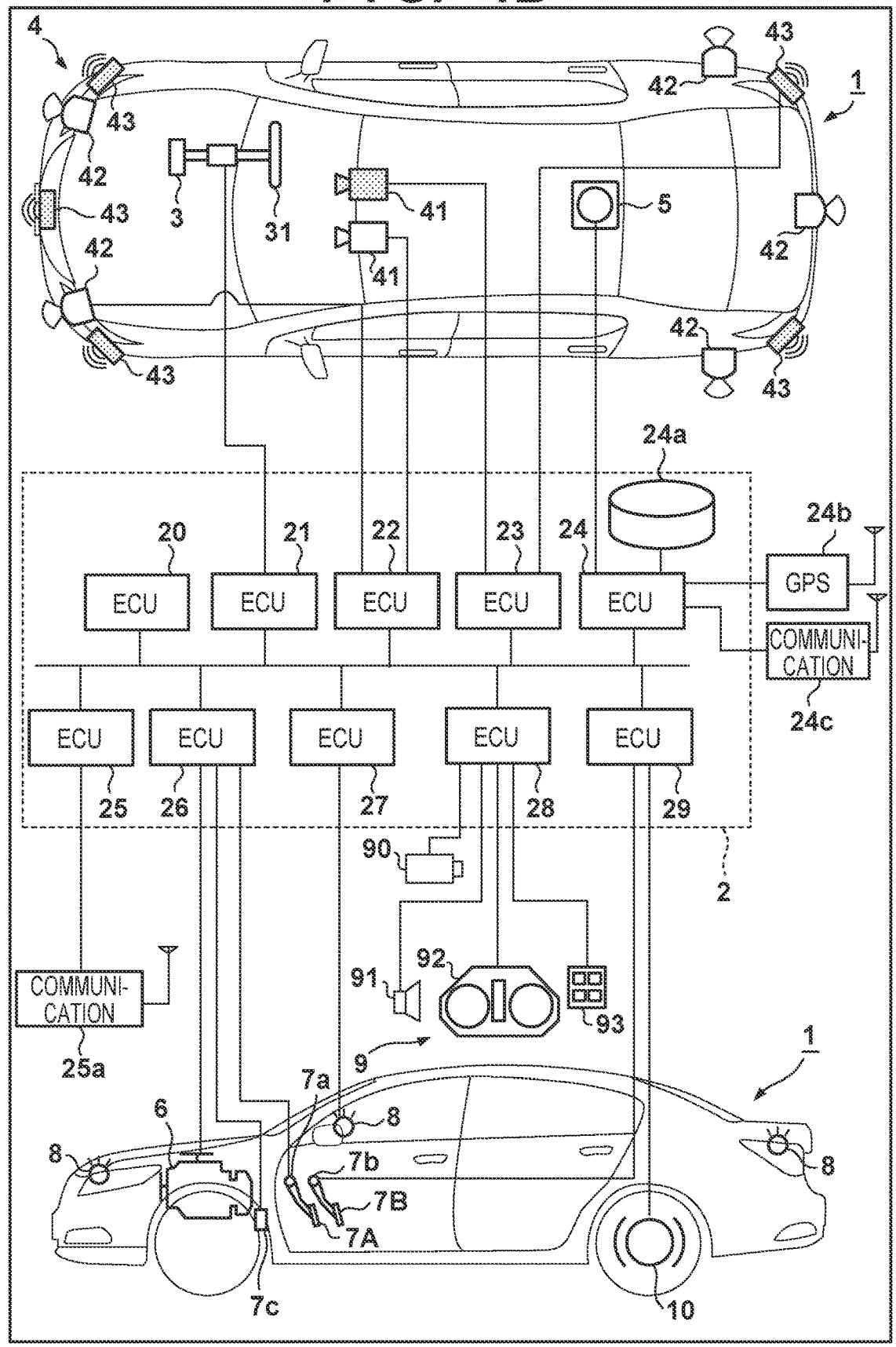
FIG. 1B is a view showing an example of the arrangement of a control block diagram for controlling a vehicle.

FIG. 1B is a view showing the arrangement example of a control block diagram of the vehicle control apparatus 100 for controlling the vehicle 1. The outline of vehicle 1 is shown by a plane view and a side view in FIG. 1B. The vehicle 1 is, for example, a sedan-type four-wheeled vehicle.

A control unit 2 shown in FIG. 1B controls each unit of the vehicle 1. The control unit 2 includes a plurality of ECUs 20 to 29 communicably connected by an in-vehicle network. Each ECU (Electronic Control Unit) includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 executes control associated with automated driving of the vehicle 1 (self-vehicle) according to this embodiment. In automated driving, at least one of steering and acceleration/deceleration of the vehicle 1 is automatically controlled. Processing associated with more specific control related to automated driving will be described in detail later.

In vehicle travel control, the ECU 20 controls the automated driving travel operation of the vehicle by setting the automated driving level based on the position of the vehicle 1 (self-vehicle) showing the peripheral state of the vehicle, the relative positions of other vehicles present in the periphery of the vehicle 1, the information of the road on which the vehicle 1 is traveling, the map information, and the like.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a component corresponding to the camera CAM of FIG. 1A and is an image capturing device (to be sometimes referred to as the camera 41 hereinafter) that performs image capturing to detect an object in the periphery of the vehicle 1. The cameras 41 are attached to the windshield inside the vehicle cabin at the roof front of the vehicle 1. The contour of a target or a division line (a white line or the like) of a lane on a road can be extracted by analyzing (image processing) the images captured by the cameras 41.

The detection unit 42 (LiDAR detection unit) is, for example, Light Detection and Ranging (LiDAR) (to be sometimes referred to as the LiDAR 42 hereinafter), and uses light to detect a target around the vehicle 1 or measures the distance to a target. The detection units 42 (LiDARs 42) are components corresponding to the LiDARs S2 of FIG. 1A. In this embodiment, a plurality of LiDARs 42 are provided around the vehicle. In the example shown in FIG. 1B, five LiDARs 42 are provided; one at each corner of the front portion of the vehicle 1, one at the center of the rear portion, and one on each side of the rear portion. The detection unit 43 (radar detection unit) is, for example, a millimeter wave radar (to be sometimes referred to as the radar 43 hereinafter), and uses radio waves to detect a target around the vehicle 1 or measures the distance to a target. The detection units 43 (radars 43) are components that correspond to radars S1 of FIG. 1A. In this embodiment, a plurality of radars 43 are provided around the vehicle. In the example shown in FIG. 1B, five radars 43 are provided; one at the center of the front portion of the vehicle 1, one at each corner of the front portion, and one at each corner of the rear portion.

The ECU 22 performs control of one camera 41 and each LiDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LiDARs, and radars are provided, the peripheral environment of the vehicle can be analyzed from various aspects. Note that the ECU 22 and the ECU 23 may be integrated into a single ECU.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server device that provides map information and traffic information and obtains these pieces of information. The ECU 24 can access a map information database 24a formed in the storage device. The ECU 24 searches for a route from the current position to the destination. The database 24a can be arranged on a network, and the communication device 24c can obtain information by accessing the database 24a on the network. The gyro sensor 5, the GPS sensor 24b, the communication device 24c are components that correspond to the gyro sensor S3, the GPS sensor S4, and the communication device C3, respectively, of FIG. 1A.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the vehicle occupant (driver) detected by an operation detection sensor 7a provided on an accelerator pedal 7A, or switches the gear ratio of the transmission based on information such as a speed detected by a speed sensor 7c (the speed sensor S5 of FIG. 1A). If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 1B, the direction indicators 8 are provided in the front portion, door mirrors, and the rear portion of the vehicle 1.

The ECU 28 can control an input/output device 9 and perform image processing on the facial image of the driver input from an in-vehicle monitoring camera 90. The in-vehicle monitoring camera 90 in this case corresponds to the in-vehicle monitoring camera MON of FIG. 1A. The input/output device 9 outputs information to the vehicle occupant (driver) and accepts settings from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification mode may be changed in accordance with the level (for example, the degree of urgency) of information of which the driver is to be notified. The voice output device 91 and the display device 92 correspond to, for example, the notification device NTF of FIG. 1A described above.

An input device 93 is a switch group that is arranged at a position where the driver can perform an operation, is used to issue an instruction to the vehicle 1, and may also include a voice input device. The input device 93 corresponds to, for example, the automated driving setting unit AD-SW and the lane change setting unit ALC-SW of FIG. 1A described above.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

(Vehicle Control Procedure of Vehicle Control Apparatus)

Figure 2:
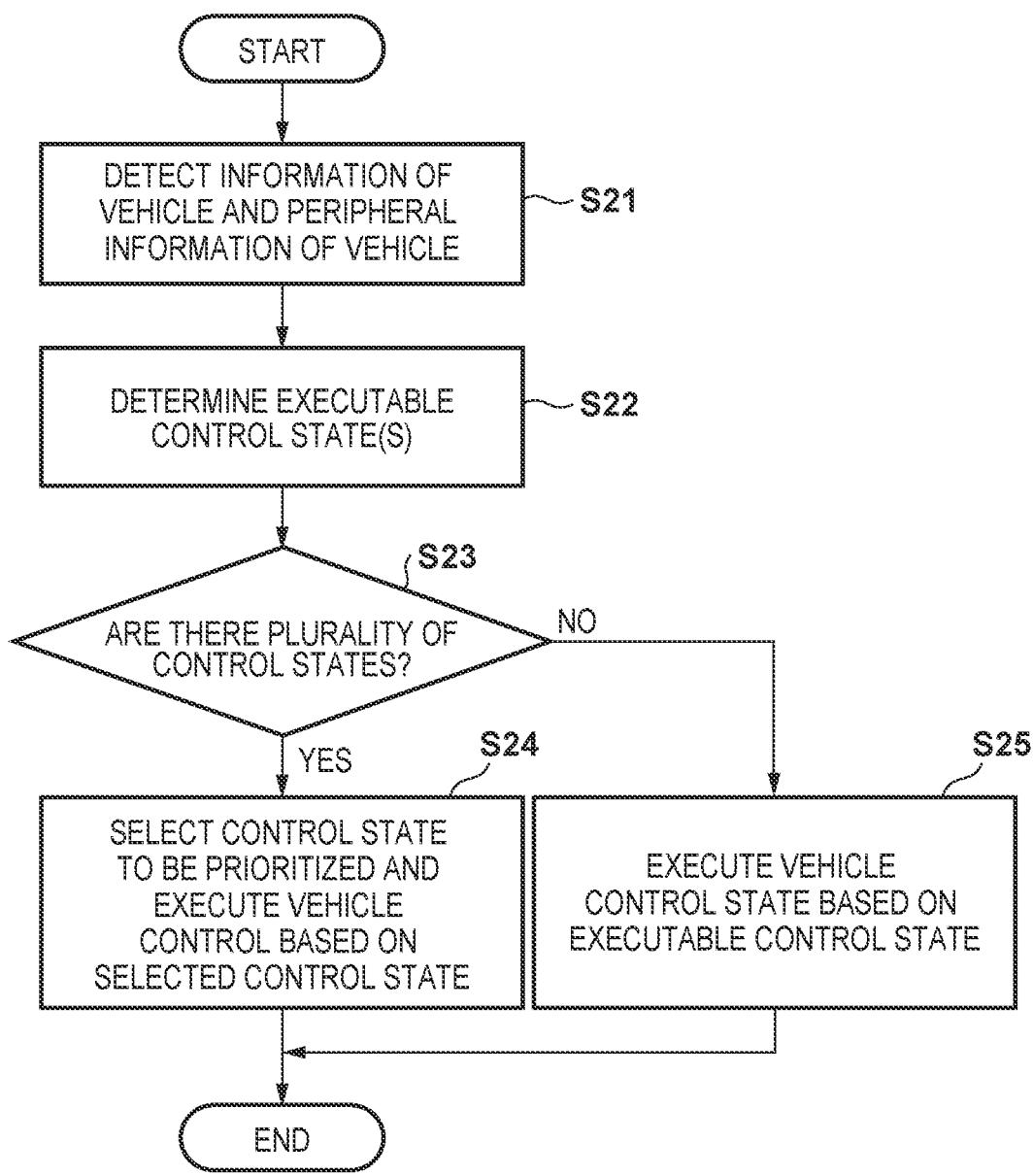
FIG. 2 is a flowchart showing the procedure of vehicle control in the vehicle control apparatus.

FIG. 2 is a flowchart showing the procedure of vehicle control performed by the vehicle control apparatus 100. First, in step S21, the detection units (the sensors S and the camera CAM (FIG. 1A), the detection units 41 to 43 (FIG. 1B), and the like) detect the information of the vehicle (self-vehicle) and the peripheral information of the vehicle.

In step S22, the vehicle controller C11 determines the executable control state(s) based on the detection results of the detection units.

In step S23, the vehicle controller C11 determines whether there are a plurality of executable control states. If it is determined by the determination processing of step S23 that there is only one executable control state (NO in step S23), the process advances to step S25, and the vehicle controller C11 will execute vehicle control by the executable control state based on the determination result of step S23.

On the other hand, if it is determined that there are a plurality of executable control states (YES in step S23), the vehicle controller C11 will advance the process to step S24, select the control state to be prioritized from the plurality of executable control states, and execute vehicle control based on the selected control state.

(Plurality of Control States)

Vehicle control processes related to acceleration/deceleration, steering including the lane change operation, braking, and the like of the vehicle and tasks to be requested to the vehicle occupant (driver) are set in each of the plurality of control states. Tasks to be requested to the vehicle occupant include, for example, gripping of the steering wheel ("hands-off" or "hands-on"), periphery monitoring ("eyes-off" or "eyes-on"), driving takeover, and the like. The plurality of control states are classified into a plurality of levels in accordance with the degree of automation (automation rate) and the degree of tasks requested (the degree of the vehicle occupant's participation in the operation of the vehicle) to the vehicle occupant (driver). The vehicle control apparatus 100 can control the vehicle based on the plurality of control states. The vehicle controller C11 controls the automated driving travel operation of the vehicle by one of the plurality of control states based on the information (external information) of the peripheral environment of the vehicle obtained from the sensors S and the camera CAM (FIG. 1A), the detection units 41 to 43 (FIG. 1B), and the like.

Figure 3:
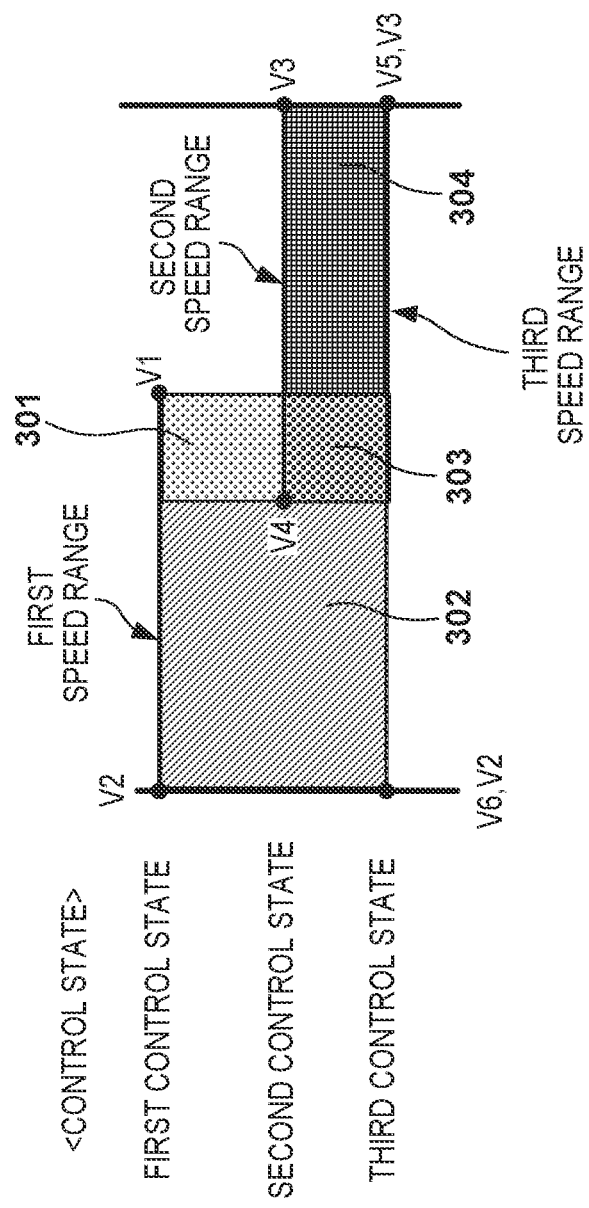
FIG. 3 is a view showing an example of executable operation ranges (speed ranges) of a plurality of control states.

FIG. 3 is a view showing an example of executable speed ranges of the plurality of control states. In this case, a first control state to a third control state are shown as an example of the plurality of control states. As shown in FIG. 3, the vehicle controller C11 can execute vehicle control based on the first control state in a first speed range in which the upper limit is a first speed (V1: for example, 80 km/h) or less and the lower limit is a second speed (V2: for example, 0 km/h) or more.

Also, the vehicle controller C11 can execute vehicle control based on the second control state in a second speed range in which the upper limit is a third speed (V3: for example, 100 km/h) or less, which is higher than the first speed V1, and the lower limit is a fourth speed (V4: for example, 60 km/h) or more, which is higher than the second speed V2.

The vehicle controller C11 can change the lower limit speed (the fourth speed V4) of the second speed range based on at least one piece of speed information of the vehicle, the speed information of the peripheral vehicles positioned in the periphery of the vehicle, and the speed information set to the road on which the vehicle is traveling. For example, the vehicle controller C11 can change the lower limit speed of the second speed range based on the average speed obtained from the speed information of the vehicle (self-vehicle) and the speed information of the peripheral vehicles detected by the detection units (the sensors S and the camera CAM (FIG. 1A), the detection units 41 to 43 (FIG. 1B), and the like). In this case, the vehicle controller C11 can obtain the speed information of the peripheral vehicles from the temporal changes of the relative distance with the vehicle (self-vehicle) obtained from the detection results of the detection units. The vehicle controller C11 can obtain the speed information by performing inter-vehicle communication with the peripheral vehicles.

The vehicle controller C11 can also change the lower limit speed of the second speed range based on the speed information (legal speed) set to the road and is detected by the corresponding detection unit.

In addition, the plurality of control states include a third control state in which vehicle control can be performed within the travel lane of the vehicle in a third speed range in which the upper limit is a fifth speed equal to the third speed and a sixth speed equal to the second speed. The vehicle controller C11 can perform vehicle control based on the third control state within the third speed range.

In this case, the first control state is a control state which has a higher automation rate (degree of automation) of vehicle control or has a smaller degree of vehicle operation participation requested to the driver than the second control state and the third control state. Also, although the automation rate (degree of automation) of vehicle control of the second control state and that of the third control state are the same, the second control state is different from the third control state in the point that, for example, it is possible to automatically perform, in relation to vehicle control for a lane change operation, a system-triggered lane change operation in accordance with the travel state of the vehicle based on the setting (setting of the lane change setting unit ALC-SW) of the driver.

The operation conditions for operating vehicle control in each control state include, for example, the vehicle speed, the travel environment of the vehicle (weather conditions such as the rainfall amount, the snowfall amount, and the like), the conditions (the curvature, the gradient, and the like) of the road on which the vehicle travels, the lane detection state (for example, the lane detection rate, the detected distance of the lane, and the like), the detection states (the agreement of the detection results of the plurality of detection units, the detection state stability, the detection result reliability which indicates that the plurality of detection units are stably detecting the same preceding vehicle serving as the detection target, and the like) of the preceding vehicle traveling immediately ahead of the vehicle 1 (self-vehicle), the number of peripheral vehicles traveling in the periphery of the vehicle, and the like.

In this embodiment, a case in which the vehicle speeds (speed ranges) overlap as the operation condition for operating vehicle control will be exemplified to describe how the control state is shifted by prioritizing one of the first control state, the second control state, and the third control state. Operation conditions other than the vehicle speed (speed range) will be described later in the fifth embodiment.

Note that although the first control state, the second control state, and the third control state will be exemplified as the control state to be executed by the vehicle control apparatus 100, the control states to be executed by the vehicle control apparatus 100 are not limited to this example. The vehicle control apparatus 100 may control the vehicle based on a control state in which the automation rate (degree of automation) of vehicle control is lower or the degree of vehicle operation participation requested to the driver is higher than the those of the second control state and the third control state.

Figure 4:
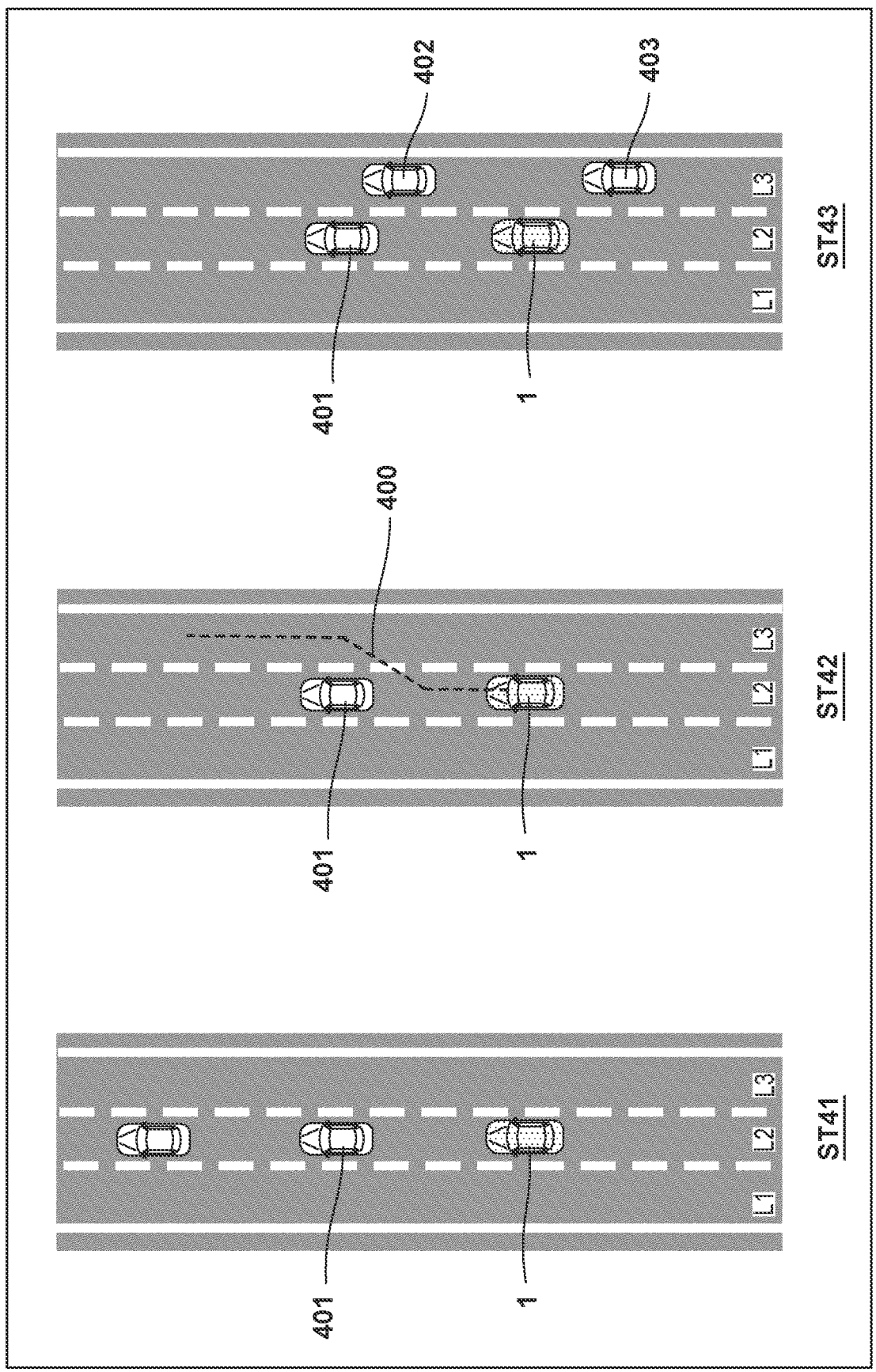
FIG. 4 is a schematic view for explaining travel states of the vehicle.

In this embodiment, the first control state is a control state in which vehicle control can be performed within a travel lane (for example, L2 shown in ST41 of FIG. 4) of the vehicle in the first speed range (V2≤a speed V of the self-vehicle≤V1) which is a first operation condition range for operating vehicle control. For example, the first control state is a control state executed in a travel scene in which the vehicle 1 (self-vehicle) is to follow a preceding vehicle 401 traveling ahead of the self-vehicle on a congested expressway main lane. Since a state in which the vehicle follows the preceding vehicle 401 is set as a condition, assume that the vehicle 1 (self-vehicle) will not make a lane change from the lane L2, on which the self-vehicle is traveling, to an adjacent lane (L1 or L3) even if the travel environment is an environment in which a lane change operation can be performed.

In the first control state, the main constituent that drives the vehicle is the vehicle control apparatus 100 (the vehicle system), and the driver neither needs to monitor the periphery nor needs to grip the steering wheel. However, the driver is required perform the duty to monitor the vehicle system so as to be ready for a warning notification from the vehicle system.

The second control state is a control state in which vehicle control within the travel lane (for example, within L2 shown in ST42 of FIG. 4) and vehicle control in which a lane change 400 from the lane L2 to an adjacent lane (for example, L1 or L3 shown in ST42 of FIG. 4) can be performed in the second speed range (V4≤the speed V of the self-vehicle≤V3) which is a second operation condition range whose operation condition range (for example, the speed range V4 to V1) partially overlaps the first speed range as the first operation condition range. For example, the second control state is a control state in which vehicle control is performed on an expressway main lane that is not congested. In the second control state, the main constituent that drives the vehicle is the driver, and the driver needs to monitor the periphery, but need not grip the steering wheel. In the second control state, a lane change can be made automatically in accordance with the travel state of the vehicle based on the setting (the setting of the lane change setting unit ALC-SW) of the driver.

The third control state is a control state that has the same automation rate (degree of automation) of vehicle control as the second control state. The third control state is a control state in which travel control can be performed within the travel lane of the vehicle in the third speed range (V6 (V2)≤the speed V of the self-vehicle≤V5 (V3)) which is a third operation condition range for operating vehicle control.

(Selection of Control State to be Prioritized when Plurality of Control States are Executable)

(Case in Which First Control State and Second Control State Are Executable)

In a case in which vehicle control can be executed based on the first control state and the second control state in a speed range 301 (FIG. 3) in which the first speed range and the second speed range overlap, the vehicle controller C11 will perform vehicle control by selecting a control state that prioritizes one of the first control state and the second control state based on the setting (the setting of the lane change setting unit ALC-SW) of the driver. More specifically, in the speed range (301 of FIG. 3) which is a speed range from the fourth speed V4 to the first speed V1 and in which the first speed range and the second speed range overlap, the vehicle controller C11 will execute vehicle control by selecting, based on the setting (the setting of the lane change setting unit ALC-SW) of the driver, the control state that prioritizes one of the first control state and the second control state.

(Case in Which First Control State and Third Control State Are Executable)

In a case in which the first control state and the third control state can be executed in a speed range (302 or 303 of FIG. 3) in which the first speed range and the third speed range overlap, the vehicle controller C11 will execute vehicle control by selecting a control state that prioritizes the first control state.

(Case in which Second Control State and Third Control State are Executable)

In addition, in a case in which vehicle control based on the second control state and the third control state can be executed in a speed range (303 or 304 of FIG. 3) in which the second speed range and the third speed range overlap, the vehicle controller C11 will execute vehicle control by selecting a control state that prioritizes one of the second control state and the third control state.

(Lane Change Setting Unit ALC-SW: ON Setting)

In a case in which the lane change request has been set (ON) by the lane change setting unit ALC-SW, the vehicle controller C11 performs vehicle control by prioritizing the second control state. For example, in a case in which vehicle control can be executed based on the first control state and the second control state in the speed range 301 (FIG. 3) in which the first speed range and the second speed range overlap, the vehicle controller C11 will perform vehicle control by prioritizing the second control state.

If the vehicle controller C11 determines that the speed of the vehicle is less than the lower limit speed (less than V4) of the overlapping speed range 301 in the result of the detection by the detection units (the sensors S and the camera CAM (FIG. 1A), the detection units 41 to 43 (FIG. 1B), and the like) in a case in which the second control state is to be prioritized in the overlapping speed range 301, the vehicle controller C11 shifts the control state of the vehicle from the second control state to the first control state.

In addition, if the vehicle controller C11 determines that the speed of the vehicle exceeds (V1<the speed V of the vehicle) the upper limit speed (V1) of the overlapping speed range 301 in the result of the detection by the detection units in a case in which the second control state is to be prioritized in the overlapping speed range 301, the vehicle controller C11 maintains the second control state as the control state of the vehicle.

Furthermore, in a case in which vehicle control can be executed based on the second control state and the third control state in the speed ranges 303 and 304 (FIG. 3) in which the second speed range and the third speed range overlap, the vehicle controller C11 performs vehicle control by prioritizing the second control state.

(Lane Change Setting Unit ALC-SW: OFF Setting)

In a case in which the lane change request has not been set (OFF) by the lane change setting unit ALC-SW, the vehicle controller C11 prioritizes the first control state in the overlapping speed range 301. For example, in a case in which vehicle control can be executed based on the first control state and the second control state in the speed range 301 (FIG. 3) in which the first speed range and the second speed range overlap, the vehicle controller C11 will perform vehicle control by prioritizing the first control state.

If the vehicle controller C11 determines that the speed of the vehicle is less than the lower limit speed (less than V4) of the overlapping speed range 301 in the result of the detection by the detection units (the sensors S and the camera CAM (FIG. 1A), the detection units 41 to 43 (FIG. 1B), and the like) in a case in which the first control state is prioritized in the overlapping speed range 301, the vehicle controller C11 maintains the first control state as the control state of the vehicle.

Also, if the vehicle controller C11 determines that the speed of the vehicle exceeds the upper limit speed (V1) of the overlapping speed range 301 in the result of the detection by the detection units (the sensors S and the camera CAM (FIG. 1A), the detection units 41 to 43 (FIG. 1B), and the like) in a case in which the first control state is prioritized in the overlapping speed range 301, the vehicle controller C11 shifts the control state of the vehicle from the first control state to the third control state. In addition, if the vehicle speed has changed to an upper limit speed or less (V1 or less) after the control state has shifted from the first control state to the third control state, the vehicle controller C11 will shift the control state of the vehicle again from the third control state to the first control state.

Furthermore, in a case in which vehicle control can be executed based on the second control state and the third control state in the speed ranges 303 and 304 (FIG. 3) in which the second speed range and the third speed range overlap, the vehicle controller C11 performs vehicle control by prioritizing the third control state.

(Specific Example of State Shift of Plurality of Control States)

Figure 5:
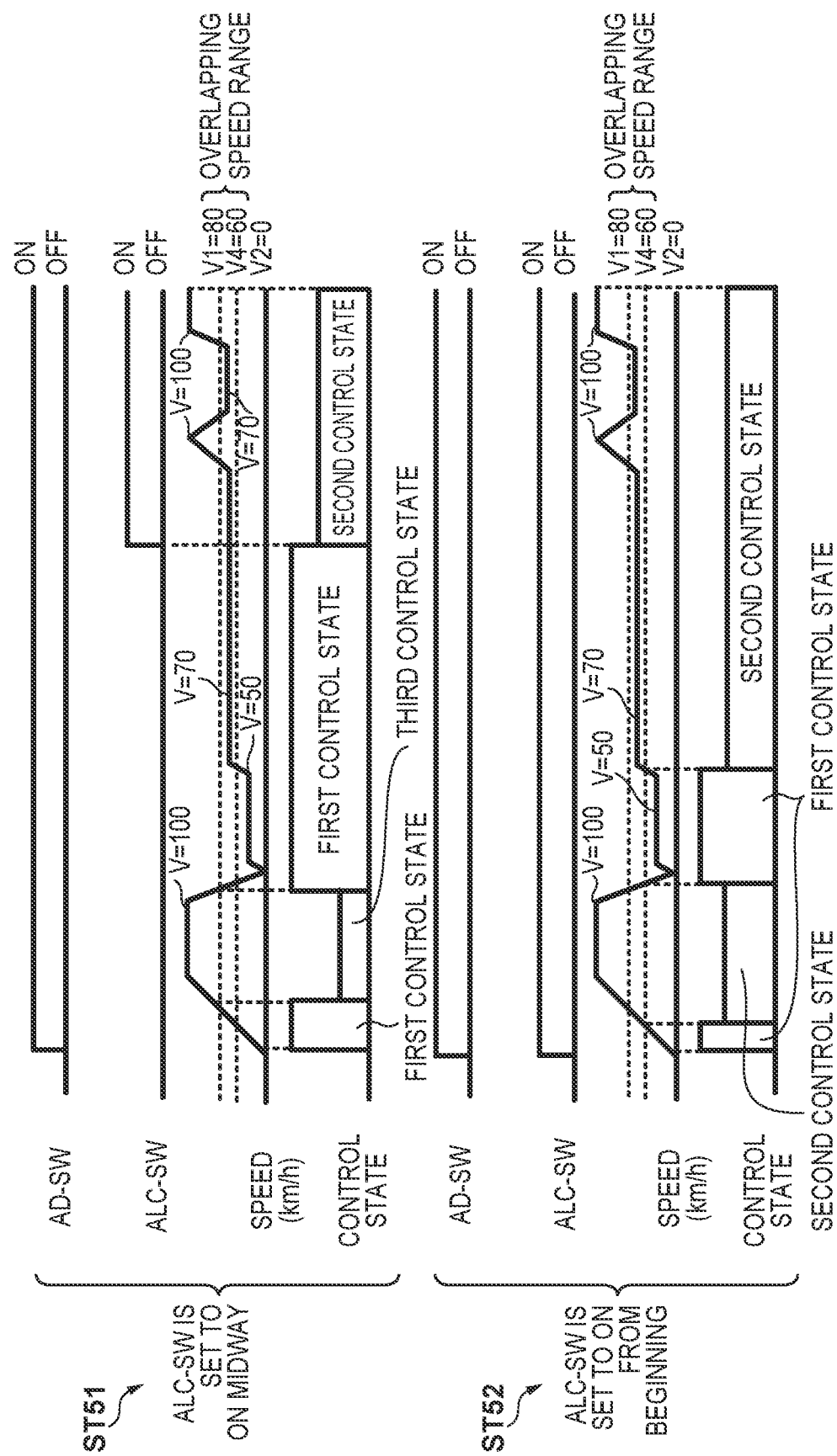
FIG. 5 is a view showing a specific example of the state shift of the plurality of control states.

FIG. 5 is a view showing a specific example of state shift of the plurality of control states. In FIG. 5, reference symbol ST51 indicates a state in which the lane change setting unit ALC-SW is set to ON midway when the vehicle is traveling by automated driving state (AD-SW: ON state), and reference symbol ST52 indicates a state in which the lane change setting unit ALC-SW is set to ON from the beginning when the vehicle is to start traveling by automated driving (AD-SW: ON state).

(Case in which Lane Change Setting Unit ALC-SW is SET to ON Midway)

In ST51, when the speed V of the vehicle 1 (self-vehicle) is within the first speed range (V2 (=0)≤the speed V of the vehicle≤V1 (=80 km/h)), the vehicle controller C11 performs vehicle control by prioritizing the first control state.

In a case in which the speed V of the vehicle 1 (self-vehicle) exceeds the upper limit speed V1 (for example, when the vehicle is accelerated to the speed V=100 km/h), the vehicle controller C11 shifts the control state of the vehicle from the first control state to the third control state. Also, in a case in which the speed of the vehicle changes to the upper limit speed or less (V1 or less (=80 km/h or less)) of the overlapping speed range 301 (FIG. 3) after the control state has shifted from the first control state to the third control state, the vehicle controller C11 will shift the control state of the vehicle from the third control state to the first control state again. In this case, even in a state in which the speed V of the vehicle 1 (self-vehicle) has increased from the speed V2 (=0) to the speed V=50 km/h, which is less than the lower limit speed V4 (=60 km/h) of the overlapping speed range 301 (FIG. 3), or in a state in which the speed V has been increased to the speed V=70 km/h, which falls within the overlapping speed range 301, the vehicle controller C11 will perform vehicle control by prioritizing the first control state.

If the lane change setting unit ALC-SW is set to ON in this case, the vehicle controller C11 will shift the control state of the vehicle from the first control state to the second control state. The vehicle controller C11 performs vehicle control by prioritizing the second control state in the overlapping speed range 301 (FIG. 3).

Furthermore, even if the vehicle controller C11 determines that the speed of the vehicle has exceeded the upper limit speed (V1) (for example, the vehicle has been accelerated to the speed V=100 km/h) of the overlapping speed range in a case in which the second control state is prioritized, the vehicle controller C11 will perform vehicle control by maintaining the second control state as the control state of the vehicle.

(Case in which Lane Change Setting Unit ALC-SW is Set to ON from Beginning)

In ST 52, in a case in which the speed V of the vehicle 1 (self-vehicle) is V2 (=0 km/h) or more and is less than the lower limit speed V4 (=60 km/h) of the overlapping speed range 301 (FIG. 3), the vehicle controller C11 performs vehicle control by prioritizing the first control.

In a case in which the speed V of the vehicle 1 (self-vehicle) has increased to the overlapping speed range 301 (FIG. 3), the vehicle controller C11 shifts the control state of the vehicle from the first control state to the second control state. Furthermore, even in a case in which the speed V of the vehicle 1 (self-vehicle) has exceeded the upper limit speed (V1) (for example, the vehicle has been accelerated to the speed V=100 km/h) of the overlapping speed range 301 (FIG. 3), the vehicle controller C11 performs vehicle control by maintaining the second control state as the control state of the vehicle.

If the vehicle controller C11 determines that the speed of the vehicle has become less than the lower limit speed (less than V4 (=less than 60 km/h) of the overlapping speed range 301 (FIG. 3) after the control state of the vehicle has shifted from the first control state to the second control state, the vehicle controller C11 will shift the control state of the vehicle from the second control state to the first control state again. In this case, even if the which the speed V of the vehicle 1 (self-vehicle) has increased from the speed V2 (=0) to the speed V=50 km/h, which is less than the lower limit speed V4 (=60 km/h) of the overlapping speed range 301 (FIG. 3), the vehicle controller C11 will perform vehicle control by prioritizing the first control state.

In a case in which the speed V of the vehicle 1 (self-vehicle) has become equal to or more than (equal to or more than V4) the lower limit speed of the overlapping speed range (for example, when the vehicle has accelerated to the speed V=70 km/h), the vehicle controller C11 shifts the control state of the vehicle from the first control state to the second control state. The vehicle controller C11 performs vehicle control by prioritizing the second control state in the overlapping speed range 301 (FIG. 3).

In addition, if the vehicle controller C11 determines that the vehicle speed has exceeded the upper limit speed (V1) of the overlapping speed range (for example, when the vehicle has accelerated to the speed V=100 km/h) in a case in which the second control state is prioritized, the vehicle controller C11 performs vehicle control by maintaining the second control state as the control state of the vehicle.

According to this embodiment, in a case in which a plurality of control states are executable, it is possible to perform vehicle control by selecting a control state which prioritizes one of the plurality of control states.

Second Embodiment (Selection of Control State Based on Lane Change History)

The first embodiment described an example in which a control state to be prioritized and selected is determined, in a case in which a plurality of control states are executable, based on, for example, the ON/OFF setting of a lane change setting unit ALC-SW, shown in FIG. 1A, as the setting of the driver. However, it is also possible to use, as an example of the setting of the driver, a lane change history of the route.

A memory C2 (storage unit) stores, as information indicating the settings of the driver, a lane change history corresponding to a route and the driver. A vehicle controller C11 can perform vehicle control by selecting a control state which prioritizes one of a first control state and a second control state based on the lane change history information stored, in the memory C2 (storage unit), as information indicating the settings of the driver.

FIG. 6 is a table showing an example of lane change history information stored in the memory C2 (storage unit). As shown in FIG. 6, the memory C2 (storage unit) stores, as the lane change history information, information of each route (for example, routes R1, R2, and R3), information of each driver (for example, drivers A, B, and C), and information indicating the history of the ON setting or the OFF setting as the setting history of the lane change setting unit ALC-SW.

For example, the memory C2 stores the fact that the driver A made an ON setting as the setting of the lane change setting unit ALC-SW when the vehicle traveled the route R1. That is, the fact that the driver A set a lane change request based on the setting of an operation unit (the lane change setting unit ALC-SW) when the vehicle traveled the route R1 in the past is stored as a lane change history.

Also, the memory C2 stores the fact that, for example, the driver C set the lane change setting unit ALC-SW to OFF when the vehicle traveled the route R2. That is, the fact that the driver C did not set a lane change request based on the setting of the operation unit (the lane change setting unit ALC-SW) when the vehicle traveled the route R2 in the past is stored as a lane change history.

In addition, the memory C2 stores the fact that, for example, the driver B set the lane change setting unit ALC-SW to ON when the vehicle traveled the route R3. That is, the fact that the driver B set a lane change request based on the setting of the operation unit (the lane change setting unit ALC-SW) when the vehicle traveled the route R3 in the past is stored as a lane change history.

In addition, the memory C2 (storage unit) can store, other than the lane change history, information indicating the frequency of lane change (for example, the number of lane changes performed within a predetermined time) when a driver is driving the vehicle manually. For example, the frequency (the number) of lane changes performed within a predetermined time when the driver B traveled the route R3 by manual driving is stored as a lane change frequency.

The vehicle controller C11 can specify a route based on information obtained by a gyro sensor S3 and a GPS sensor S4, map information obtained via a communication device C3, and the like. Also, an image processor C12 of a computer COM can perform image processing on an image of the driver captured by an in-vehicle monitoring camera MON, and the vehicle controller C11 can specify the driver based on the image processing result of the image processor C12. The specification of the route and the driver will allow the vehicle controller C11 to obtain information indicating the corresponding lane change history from the memory C2 (storage unit). As a result, in a case in which vehicle control can be executed based on a plurality of control states in the specified route, the vehicle controller C11 can select the control state to be prioritized based on the information indicating the obtained lane change history.

In addition, the specification of the route and the driver will allow the vehicle controller C11 to obtain information indicating the corresponding lane change frequency from the memory C2 (storage unit). As a result, in a case in which vehicle control can be executed based on a plurality of control states in the specified route, the vehicle controller C11 can select the control state to be prioritized based on the information indicating the obtained lane change frequency.

Third Embodiment (Case Using Congestion Information of Adjacent Lane)

The first embodiment described an example in which a control state to be prioritized and selected is determined, in a case in which a plurality of control states are executable, based on, for example, the ON/OFF setting of a lane change setting unit ALC-SW, shown in FIG. 1A, as the setting of the driver. However, it is also possible to determine the control state to be prioritized and selected by further considering the congestion status of an adjacent lane as a factor.

A vehicle controller C11 determines whether an adjacent lane is congested based on the detection results of detection units (sensors S and a camera CAM (FIG. 1A), detection units 41 to 43 (FIG. 1B), and the like), and the vehicle controller C11 can control the vehicle by selecting a control state prioritizing one of a first control state and a second control state based on the setting of the driver and the result of the determination.

In a case in which the vehicle controller C11 is to prioritize the second control state in an overlapping speed range (a speed range 301 of FIG. 3) based on the setting of the driver, the vehicle controller C11 will prioritize the first control state if it is determined that an adjacent lane (for example, an adjacent lane L3 of ST43 of FIG. 4) is congested based on the result of adjacent lane congestion determination, and the vehicle controller C11 will prioritize the second control state if it is not determined that the adjacent lane L3 is not congested. That is, if the adjacent lane L3 is congested, the vehicle controller C11 will perform vehicle control by changing the priority order of the second control state based on the setting of the driver and prioritizing and selecting the first control state.

The vehicle controller C11 will determine, based on the detection results of the detection units (sensors S and a camera CAM (FIG. 1A), detection units 41 to 43 (FIG. 1B), and the like), that the adjacent lane L3 is a congested in a case in which the distance between peripheral vehicles 402 and 403, which are traveling on the adjacent lane L3 of a travel lane L2 of the vehicle 1, is a predetermined distance or less.

The vehicle controller C11 can also determine, based on the detection results of the detection units, that the adjacent lane L3 is congested in a case in which the average speed or the maximum speed of the peripheral vehicles 402 and 403 traveling on the adjacent lane L3 is a predetermined speed or less (for example, the average speed or the maximum speed of the peripheral vehicles 402 and 403 are a predetermined speed or less in an expressway main lane). Alternatively, the vehicle controller C11 can determine whether the adjacent lane is congested based on road traffic information or the like obtained via a communication device C3.

In a case in which vehicle control can be executed based on a plurality of control states in a route, the vehicle controller C11 can select the control state to be prioritized based on the setting of the driver and the congestion state of the adjacent lane.

Fourth Embodiment (Selection of Control State to be Prioritized Based on Driving State of Vehicle)

A vehicle controller C11 can select a control state to be prioritized based on the driving state (immediately preceding speed information) regardless of the setting of a lane change setting unit ALC-SW. The vehicle controller C11 can also control the vehicle by selecting the first control state as the control state to be prioritized in the case of a vehicle driving state in which the speed shifts from a low speed side, which has a speed lower than a lower limit speed (V4) of an overlapping speed range 301 (FIG. 3), to the speed range 301.

In addition, the vehicle controller C11 can also control the vehicle by selecting the second control state as the control state to be prioritized in the case of a vehicle driving state in which the speed shifts from a high speed side, which has a speed higher than an upper limit speed (V1) of the overlapping speed range 301 (FIG. 3), to the speed range 301. The selection of the control state based on the driving state (immediately preceding speed information) of the vehicle is performed in the same manner as the selection of the control state based on the ON state of the lane change setting unit ALC-SW. Hence, by keeping the ON setting of the lane change setting unit ALC-SW, the vehicle controller C11 can perform vehicle control by selecting the control state based on the driving state (immediately preceding speed information) of the vehicle.

Fifth Embodiment (Case Using Operation Condition Other than Vehicle Speed)

Each above-described embodiment described, by exemplifying a case in which the vehicle speed (speed range) overlaps as an operation condition, how the control state is shifted by prioritizing one of a first control state, a second control state, and a third control state. This embodiment will describe the control state shift executed in a case in which the range of an operation condition other than the vehicle speed (speed range) overlaps as an operation condition.

Other than the vehicle speed (speed range), the operation conditions for operating vehicle control include, for example, the travel environment of the vehicle (weather conditions such as the rainfall amount, the snowfall amount, and the like), the conditions (the curvature, the gradient, and the like) of the road on which the vehicle travels, the lane detection state (for example, the lane detection rate, the detected distance of the lane, and the like), the detection states (for example, the agreement of the detection results (the vehicle type, the position of the vehicle, distance from the self-vehicle, and the like) by a plurality of cameras 41, LiDARs 42, and radars 43, the detection state stability which indicates that the preceding vehicle is being detected continuously since the detection of the preceding vehicle, the detection result reliability which indicates that the plurality of cameras 41, LiDARs 42, and radars 43 are stably detecting the same preceding vehicle as the detection target, and the like) of the preceding vehicle traveling immediately ahead of a vehicle 1 (self-vehicle), the degree of congestion (for example, the number of peripheral vehicles traveling about the self-vehicle within a predetermined range) in the periphery of the vehicle, and the like. Note that the vehicle type includes, for example, heavy vehicles such as buses, trucks, and the like, ordinary vehicles, light vehicles, and motorcycles. To obtain the number of peripheral vehicles, a CPU C1 of a computer COM can use, other than the physical number of vehicles, a numerical value obtained by performing a conversion based on the detected areas of the respective vehicles detected by sensors S and a camera CAM. For example, since the detected area of a heavy vehicle will be large even if only one vehicle is present, it can be counted as N vehicles (N is an integer) by performing a conversion using the size of an ordinary vehicle as a reference.

In a case in which, for example, the rainfall amount is set as an operation condition among the travel environments of the vehicle, the first control state is a control state in which vehicle control can be performed within the travel lane (for example, L2 shown in ST41 of FIG. 4) of the vehicle in a first rainfall amount range (a range defined by a lower limit rainfall amount W2 and an upper limit rainfall amount W1) which is a first operation condition range for operating vehicle control. In this case, the upper limit rainfall amount W1 (first operation value) and the lower limit rainfall amount W2 (second operation value) correspond to, for example, V1 and V2, respectively, of FIG. 3.

In addition, the second control state is a control state in which vehicle control can be performed within the travel lane (for example, L2 shown in ST42 of FIG. 4) of the vehicle and be performed to make a lane change from the lane L2 to an adjacent lane (L1 or L3 shown in ST42 of FIG. 4) in a second rainfall amount range (a range defined by a lower limit rainfall amount W4 and an upper limit rainfall amount W3) which is a second operation condition range for operating vehicle control and whose operation range partially overlaps the first rainfall amount range as the first operation range. In this case, the upper limit rainfall amount W3 (third operation value) and the lower limit rainfall amount W4 (fourth operation value) correspond to, for example, V3 and V4, respectively, of FIG. 3.

Also, the third control state is a control state in which vehicle control can be performed within the travel lane of the vehicle 1 in a third rainfall amount range (a range defined by a lower limit rainfall amount W6 (W2) and an upper limit rainfall amount W5 (W3)) which is a third operation condition range for operating vehicle control. In this case, the upper limit rainfall amount W5 (fifth operation value) and the lower limit rainfall amount W6 (sixth operation value) correspond to, for example, V5 and V6, respectively, of FIG. 3.

Similarly, in a case in which the curvature of a curve is set as the operation condition among the conditions of the road on which the vehicle 1 is traveling, a first curvature range which is a first operation condition range for operating vehicle control will be defined by a lower limit curvature RR2 and an upper limit curvature RR1. In this case, the upper limit curvature RR1 (first operation value) and the lower limit curvature RR2 (second operation value) correspond to, for example, V1 and V2, respectively, of FIG. 3.

Also, a second curvature range which is the second operation condition range is defined by a lower limit curvature RR4 and an upper limit curvature RR3. In this case, the upper limit curvature RR3 (third operation value) and the lower limit curvature RR4 (fourth operation value) correspond to, for example, V3 and V4, respectively, of FIG. 3.

A third curvature range which is the third operation condition range is defined by a lower limit curvature RR6 (RR2) and an upper limit curvature RR5 (RR3). In this case, the upper limit curvature RR5 (fifth operation value) and the lower limit curvature RR6 (sixth operation value) correspond to, for example, V5 and V6, respectively, of FIG. 3.

The first operation condition range, the second operation condition range, and the third operation condition range can be set in the same manner to each operation condition such as the lane detection state, the detection state of a preceding vehicle, and the degree of congestion in the periphery of the vehicle. In a case in which the operation condition ranges overlap, the vehicle controller C11 can shift the control state in the same manner as the state shift performed in the case in which the speed ranges overlap as described in the first to fourth embodiments.

(Case in which First Control State and Second Control State are Executable)

In a case in which vehicle control can be executed based on the first control state and the second control state in an operation condition range in which the first operation condition range and the second operation condition range overlap (for example, a range corresponding to a speed range 301 of FIG. 3), the vehicle controller C11 controls the vehicle 1 by selecting a control state prioritizing one of the first control state and the second control state based on the setting (the setting of the lane change setting unit ALC-SW) of the driver. More specifically, in the operation condition range (corresponding to 301 of FIG. 3) between a fourth operation condition (corresponding to V4 of FIG. 3) and a first operation condition (corresponding to V1 of FIG. 3) that is an operation condition range in which the first operation condition range and the second operation condition range overlap, the vehicle controller C11 can control the vehicle 1 by selecting a control state prioritizing one of the first control state and the second control state based on the setting (the setting of the lane change setting unit ALC-SW) of the driver.

(Case in which First Control State and Third Control State are Executable)

In a case in which the first control state and the third control state can be executed in an operation condition range (302 or 303 of FIG. 3) in which the first operation condition range and the third operation range overlap, the vehicle controller C11 can control the vehicle 1 by selecting a control state that prioritizes the first control state.

(Case in which Second Control State and Third Control State are Executable)

In addition, in a case in which vehicle control based on the second control state and the third control state can be executed in an operation condition range (303 or 304 of FIG. 3) in which the second operation condition range and the third operation range overlap, the vehicle controller C11 can control the vehicle 1 by selecting a control state prioritizing one of the second control state and the third control state based on the setting (the setting of the lane change setting unit ALC-SW) of the driver.

Note that the vehicle controller C11 can perform display control to cause a display device 92 or cause, via a communication device C3, a display unit of a portable terminal device of the driver to display a plurality of operation conditions (for example, the vehicle speed, the travel environment of the vehicle 1, the conditions of the road on which the vehicle 1 is traveling, the lane detection state, the detection state of a preceding vehicle, the degree of congestion in the periphery of the vehicle, and the like). The driver can select an operation condition to be used in the state shift from the plurality of operation conditions displayed on the display device 92 or the like. The vehicle controller C11 performs, based on the selected operation condition, vehicle control by shifting the control state in a case in which the operation condition ranges overlap. As a result, it is possible to perform vehicle control by shifting the control state based on based on the operation condition intended by the driver.

OTHER EMBODIMENTS

In addition, a vehicle control program configured to implement at least one function of the above-described embodiments is supplied to a system or an apparatus via a network or a storage medium, and at least one processor in the computer of the system or the apparatus can read out and execute the program. The present invention can be implemented by such a mode as well.

<Summary of Embodiments>

Arrangement 1. There is provided a vehicle control apparatus according to the above-described embodiment which is a vehicle control apparatus (for example, 100) that controls a vehicle (for example, 1 of FIG. 1B) based on a plurality of control states, comprising:

detection means (for example, sensors S and a camera CAM of FIG. 1A and detection units 41-43 of FIG. 1B) for detecting information of the vehicle (1) and peripheral information of the vehicle (1); and vehicle control means (for example, a vehicle controller C11) for controlling the vehicle (1) based on a detection result of the detection means, wherein in a case in which the vehicle control means (C11) can execute, based on the detection result of the detection means, a first control state in which vehicle control can be performed in a travel lane of the vehicle (1) in a first operation condition range for operating vehicle control and a second control state in which vehicle control can be performed in the travel lane and vehicle control to make a lane change from the travel lane to an adjacent lane can be performed in a second operation condition range whose operation condition range partially overlaps the first operation condition range, the vehicle control means controls the vehicle by selecting, based on a setting (for example, the ON setting or the OFF setting of a lane change setting means ALC-SW of FIG. 1A) of the driver, a control state prioritizing one of the first control state and the second control state in the overlapping operation condition range.

According to the vehicle control apparatus of arrangement 1, in a case in which a plurality of control states are executable, vehicle control can be performed by selecting a control state prioritizing one of the plurality of control states. For example, in a case in which the first control state and the second control state can be executed in an overlapping operation condition range, a control state to be prioritized can be selected based on the setting of a driver (user).

Arrangement 2. There is provided the vehicle control apparatus (100) according to the above-described embodiment, further comprising:

setting means (for example, the lane change setting means ALC-SW of FIG. 1A) for setting a lane change request in the second control state, wherein in a case in which the lane change request is set by the setting means (ALC-SW), the vehicle control means (C11) controls the vehicle by prioritizing the second control state.

According to the vehicle control apparatus of arrangement 2, in a case in which the lane change request of the driver can be reflected to the control state in automated driving and the first control state and the second control state can be executed in the overlapping operation condition range, the second control state can be prioritized.

Arrangement 3. There is provided the vehicle control apparatus (100) according to the above-described embodiment, wherein the vehicle control means (C11) can perform vehicle control based on the first control state in an operation condition range in which an upper limit operation value of the first operation condition range is not more than a first operation value (for example, V1 of FIG. 3) and a lower limit operation value of the first operation condition range is not less than a second operation value (for example, V2 of FIG. 3), and can perform vehicle control based on the second control state in an operation condition range in which an upper limit operation value of the second operation condition range is not more than a third operation value (for example, V3 of FIG. 3) which is larger than the first operation value and a lower limit operation value of the second operation condition range is not less than a fourth operation value (for example, V4 of FIG. 3) which is smaller than the first operation value and is larger than the second operation value.

Arrangement 4. There is provided the vehicle control apparatus (100) according to the above-described embodiment, wherein in an operation condition range (for example, 301 of FIG. 3) between the fourth operation value and the first operation value which is an operation condition range in which the first operation condition range and the second operation condition range overlap, the vehicle control means (C11) controls the vehicle by selecting, based on the setting, a control state prioritizing one of the first control state and the second control state.

According to the vehicle control apparatus of arrangement 3 or 4, vehicle control can be performed by selecting, based on the setting of the driver, a control state prioritizing one of the first control state and the second control state. As a result, it is possible to perform vehicle control by selecting a control state that should be prioritized for the driver.

Arrangement 5. There is provided the vehicle control apparatus (100) according to the above-described embodiment, wherein if the vehicle control means (C11) determines that an operation value is less than the lower limit operation value (for example, V4 of FIG. 3) of the overlapping operation condition range (301) in the detection result in a case in which the second control state is to be prioritized in the overlapping operation condition range, the vehicle control means (C11) shifts the control state of the vehicle from the second control state to the first control state.

According to the vehicle control apparatus of arrangement 5, in a case in which the second control state is to be prioritized in a state in which the first control state and the second control state can be executed in the overlapping operation condition range, the control state can shift from the second control state to the first control state when the operation value becomes less than the lower limit operation value of the overlapping operation condition range.

Arrangement 6. There is provided the vehicle control apparatus (100) according to the above-described embodiment, wherein in a case in which the first operation condition range is a speed range in which an upper limit operation value is not more than a first speed and a lower limit operation value is not less than a second speed and the second operation condition range is a speed range in which the upper limit operation value is not more than a third speed which is higher than the first speed and the lower limit operation value is not less than a fourth speed which is lower than the first speed and higher than the second speed, the vehicle control means (C11) changes a lower limit speed (V4), which is the lower limit operation value of the second operation condition range, based on at least one piece of information among speed information of the vehicle, speed information of a peripheral vehicle positioned in a periphery of the vehicle, and speed information set to a road on which the vehicle is traveling.

According to the vehicle control apparatus of arrangement 6, the setting of the lower limit speed, which is the lower limit operation value of the second operation condition range for executing the second control state, can be changed based on the travel environment.

Arrangement 7. There is provided the vehicle control apparatus (100) according to the above-described embodiment, wherein the vehicle control means changes the lower limit speed (V4), which is the lower limit operation value of the second operation condition range, based on an average value obtained from the speed information of the vehicle and the speed information of the peripheral vehicle which are detected by the detection means.

According to the vehicle control apparatus of arrangement 7, the setting of the lower limit speed, which is the lower limit operation value of the second operation condition range for executing the second control state, can be changed based on an average speed obtained from the speed information of the vehicle (self-vehicle) and the speed information of the peripheral vehicle.

Arrangement 8. There is provided the vehicle control apparatus (100) according to the above-described embodiment, wherein the vehicle control means changes the lower limit speed (V4), which is the lower limit operation value of the second operation condition range, based on the speed information set to the road which is detected by the detection means.

According to the vehicle control apparatus of arrangement 8, the setting of the lower limit speed, which is the lower limit operation value of the second operation condition range for executing the second control state, can be changed based on the speed information set to the road.

Arrangement 9. There is provided the vehicle control apparatus (100) according to the above-described embodiment, further comprising:

storage means (for example, a memory C2 of FIG. 1A) for storing, as information indicating the setting of the driver, a lane change history corresponding to a route and the driver, wherein the vehicle control means (C11) controls the vehicle by selecting a control state by prioritizing one of the first control state and the second control state based on the lane change history.

According to the vehicle control apparatus of arrangement 9, in a case in which the lane change history (driving preference) of the driver (user) can be reflected to the control state in automated driving and the first control state and the second control state can be executed in the overlapping operation condition range, the control state to be prioritized can be selected based on the lane change history.

Arrangement 10. There is provided the vehicle control apparatus (100) according to the above-described embodiment, wherein the vehicle control means (C11) determines whether the adjacent lane is congested based on the detection result of the detection means for detecting a peripheral vehicle traveling on the adjacent lane, and the vehicle control means (C11) controls the vehicle by selecting, based on the setting of the driver and the result of the determination, a control state prioritizing one of the first control state and the second control state.

Arrangement 11. There is provided the vehicle control apparatus (100) according to the above-described embodiment, wherein in a case in which the vehicle control means (C11) determines, based on the setting of the driver, that the second control state is to be prioritized in the overlapping operation condition range, the vehicle control means (C11) will prioritize the first control state if the adjacent lane is determined to be congested based on the result of the determination, and the vehicle control means (C11) will prioritize the second control state if the adjacent lane is not determined to be congested.

According to the vehicle control apparatus of arrangement 10 or 11, in a case in which the congestion state of the adjacent lane can be reflected, in addition to the setting of the driver (user), to the selection of the control state in automated driving and the first control state and the second control state can be executed in the overlapping operation condition range, the control state to be prioritized can be selected based on the determination result indicating whether the adjacent lane is congested.

Arrangement 12. There is provided the vehicle control apparatus according to the above-described embodiment, the plurality of control states include a third control state in which vehicle control can be performed in the travel lane of the vehicle in a third operation condition range in which a fifth operation value (for example, V5 of FIG. 3) equal to the third operation value (V3) is set as the upper limit and a sixth value (for example, V6 of FIG. 3) equal to the second operation value (V2) is set as the lower limit, the first control state is a control state which has a higher automation rate of vehicle control or has a smaller degree of vehicle operation participation requested to the driver than the second control state, and the third control state is control state which has an automation rate of vehicle control equal to the automation rate of vehicle control of the second control state, and the third control state is a control state in which vehicle control can be performed in the travel lane of the vehicle in the third operation condition range for operating the vehicle control.

Arrangement 13. There is provided the vehicle control apparatus according to the above-described embodiment, wherein in a case in which the first control state and the third control state can be executed in an operation condition range (for example, 302, 303 of FIG. 3) in which the first operation condition range and the third operation condition range overlap, the vehicle control means (C11) controls the vehicle by selecting a control state prioritizing the first control state.

According to the vehicle control apparatus of arrangement 12 or 13, in a case in which the first control state and the third control state can be executed in the overlapping operation condition range, the first control state can be prioritized and selected.

Arrangement 14. There is provided the vehicle control apparatus (100) according to the above-described embodiment, wherein in a case in which the first control state is to be prioritized in the overlapping operation condition range (302, 303), the vehicle control means (C11) shifts the control state of the vehicle from the first control state to the third control state when the vehicle control means (C11) determines, based on the detection result, that an operation value has exceeded the upper limit operation value (V1) of the overlapping operation condition range, and the vehicle control means shifts (C11) the control state of the vehicle from the third control state to the first control state again when the operation value has become not more than the upper limit operation value (V1) after the shift.

According to the vehicle control apparatus of arrangement 14, in a case in which the first control state is prioritized in a state in which the first control state and the third control state can be executed, the control state can be shifted from the first control state to the third control state when the operation value exceeds the upper limit operation value of the overlapping operation condition range, and the control state can be shifted again from the third control state to the first control state when the operation value changes to an operation value that falls within the overlapping operation condition range.

Arrangement 15. There is provided the vehicle control apparatus (100) according to the above-described embodiment, wherein in a case in which the second control state and the third control state can be executed in an operation condition range (for example, 303, 304 of FIG. 3) in which the second operation condition range and the third operation condition range overlap, the vehicle control means (C11) controls the vehicle by selecting, based on the setting (ON setting or OFF setting of the lane change setting means ALC-SW) of the driver, a control state prioritizing one of the second control state and the third control state.

According to the vehicle control apparatus of arrangement 15, in a case in which the second control state and the third control state can be executed in the overlapping operation condition range, the control state to be prioritized can be selected based on the setting of the driver (user).

Arrangement 16. There is provided a vehicle control apparatus according to the above-described embodiment which is a vehicle control apparatus (for example, 100) that controls a vehicle based on a plurality of control states, comprising:

detection means (for example, sensors S and a camera CAM of FIG. 1A and detection units 41-43 of FIG. 1B) for detecting information of the vehicle and peripheral information of the vehicle; and vehicle control means (for example, a vehicle controller C11) for controlling the vehicle based on the detection result of the detection means, wherein in a case in which the vehicle control means (C11) can execute, based on the detection result of the detection means, a first control state in which vehicle control can be performed in a travel lane of the vehicle in a first operation condition range for operating vehicle control and a second control state in which vehicle control can be performed in the travel lane and vehicle control to make a lane change from the travel lane to an adjacent lane can be performed in a second operation condition range whose operation condition range partially overlaps the first operation condition range, the vehicle control means controls the vehicle by selecting, based on a driving state of the vehicle, a control state prioritizing one of the first control state and the second control state in the overlapping operation condition range.

Arrangement 17. There is provided the vehicle control apparatus (100) according to the above-described embodiment, wherein in a case in which, in the driving state of the vehicle, an operation value shifts from a lower limit side, which has a smaller operation value than a lower limit operation value of the overlapping operation condition range, to the operation condition range, the vehicle control means (C11) controls the vehicle by selecting the first controls state as a prioritized control state, and in a case in which, in the driving state of the vehicle, the operation value shifts from an upper limit side, which has a larger operation value than an upper limit operation value of the overlapping operation condition range, to the operation condition range, the vehicle control means controls the vehicle by selecting the second control state as the prioritized control state.

According to the vehicle control apparatus of arrangement 16 or 17, in a case in which the operation value shifts to the overlapping operation condition range, vehicle control can be performed by setting a control state prioritizing the control state that has been selected immediately before the shift. As a result, it can reduce the control state shifts and reduce the sense of uneasiness given to the driver.

Arrangement 18. There is provided the vehicle control apparatus (100) according to the above-described embodiment, wherein in a case in which the setting means has not set the lane change request, the vehicle control means controls the vehicle by prioritizing the first control state.

According to the vehicle control apparatus of arrangement 18, in a case in which a lack of the lane change request from the driver can be reflected to the control state in automated driving and the first control state and the second control state can be executed in the overlapping operation condition range, the first control state can be prioritized.

Arrangement 19. There is provided the vehicle control apparatus (100) according to the above-described embodiment, further comprising:

storage means (for example, a memory C2 of FIG. 1A) for storing, as information indicating the setting of the driver, a lane change frequency corresponding to a route and the driver, wherein the vehicle control means (C11) controls the vehicle by selecting, based on the lane change frequency, a control state prioritizing one of the first control state and the second control state.

According to the vehicle control apparatus of arrangement 19, in a case in which the lane change frequency of the driver (user) can be reflected to the control state in automated driving and the first control state and the second control state can be executed in the overlapping operation condition range, the control state to be prioritized can be selected based on the lane change frequency.

Arrangement 20. There is provided a vehicle (for example, a vehicle 1 of FIG. 1B) according to the above-described embodiment which is a vehicle that can travel based on control by a vehicle control apparatus, comprising:

the vehicle control apparatus (for example, a vehicle control apparatus 100 of FIG. 1A) defined in any one of arrangements 1 to 19.

According to the vehicle of arrangement 20, it is possible to provide, in a case in which a plurality of control states are executable, a vehicle that can travel by performing vehicle control by selecting a control state to be prioritized from the plurality of control states.

Arrangement 21. There is provided a vehicle control method of a vehicle control apparatus (100) according to the above-described embodiment which is a vehicle control method that controls a vehicle based on a plurality of control states, the method comprising:

a detection step of detecting (for example, S21 of FIG. 2), by a detection means, information of the vehicle and peripheral information of the vehicle; and a vehicle control step of controlling (for example, S22-S25 of FIG. 2) the vehicle based on a detection result in the detecting step, wherein in a case in which it is possible to execute, in the vehicle control step, based on the detection result of the detection means, a first control state in which vehicle control can be performed in a travel lane of the vehicle in a first operation condition range for operating vehicle control and a second control state in which vehicle control can be performed in the travel lane and vehicle control to make a lane change from the travel lane to an adjacent lane can be performed in a second operation condition range whose operation condition range partially overlaps the first operation condition range, the vehicle is controlled (for example, S24 of FIG. 2) by selecting, based on a setting of the driver, a control state prioritizing one of the first control state and the second control state in the overlapping operation condition range.

According to the vehicle control method of the vehicle control apparatus of arrangement 21, in a case in which a plurality of control states are executable, vehicle control can be performed by selecting a control state to be prioritized from the plurality of control states. For example, in a case in which the first control state and the second control state can be executed in the overlapping operation condition range, the control state to be prioritized can be selected based on the setting of the driver (user).

Arrangement 22. There is provided a vehicle control method of a vehicle control apparatus (100) according to the above-described embodiment which is a vehicle control method of a vehicle control apparatus that controls a vehicle based on a plurality of control states, the method comprising:

a detection step of detecting (for example, S21 of FIG. 2), by a detection means, information of the vehicle and peripheral information of the vehicle; and a vehicle control step of controlling (for example, S22 to S25 of FIG. 2) the vehicle based on the detection result in the detecting step, wherein in a case in which it is possible to execute, in the vehicle control step, based on the detection result of the detection means, a first control state in which vehicle control can be performed in a travel lane of the vehicle in a first operation condition range for operating vehicle control and a second control state in which vehicle control can be performed in the travel lane and vehicle control to make a lane change from the travel lane to an adjacent lane can be performed in a second operation condition range whose operation condition range partially overlaps the first operation condition range, the vehicle is controlled (for example, S24 of FIG. 2) by selecting, based on a driving state of the vehicle, a control state prioritizing one of the first control state and the second control state in the overlapping operation condition range.

According to the vehicle control method of the vehicle control apparatus of arrangement 22, in a case in which a plurality of control states are executable, vehicle control can be performed by selecting a control state to be prioritized from the plurality of control states. For example, in a case in which the first control state and the second control state can be executed in the overlapping operation condition range, the control state to be prioritized can be selected based on the driving state of the vehicle.

Arrangement 23. There is provided a storage medium storing a program according to the above-described embodiment that causes a computer (for example, a CPU) to execute each step of a vehicle control method defined in arrangement 21 or 22.

According to the storage medium storing the program of arrangement 23, it is possible to provide, in a case in which a plurality of control states are executable, a program that can execute vehicle control by selecting a control state to be prioritized from the plurality of control states.

The invention is not limited to the foregoing embodiments, and various variations/changes are possible within the spirit of the invention.

What is claimed is:

1. A vehicle control apparatus that controls a vehicle based on a plurality of control states, comprising:
a detection unit configured to detect information of the vehicle and peripheral information of the vehicle; and
a vehicle control unit configured to control the vehicle based on a detection result of the detection unit,
wherein in a case in which the vehicle control unit can execute, based on the detection result of the detection unit,
a first control state in which vehicle control can be performed in a travel lane of the vehicle in a first operation condition range for operating vehicle control, wherein the first operation condition range is a speed range in which an upper limit operation value is not more than a first speed and a lower limit operation value is not less than a second speed and
a second control state in which vehicle control can be performed in the travel lane and vehicle control to make a lane change from the travel lane to an adjacent lane can be performed in a second operation condition range whose operation condition range partially overlaps the first operation condition range, wherein the second operation condition range is a speed range in which the upper limit operation value is not more than a third speed which is higher than the first speed and the lower limit operation value is not less than a fourth speed which is lower than the first speed and higher than the second speed,
the vehicle control unit controls the vehicle by selecting, based on a setting of the driver, a control state prioritizing one of the first control state and the second control state in the overlapping operation condition range from the fourth speed to the first speed.

2. The apparatus according to claim 1, further comprising:
a setting unit configured to set a lane change request in the second control state,
wherein in a case in which the lane change request is set by the setting unit, the vehicle control unit controls the vehicle by prioritizing the second control state.

3. The apparatus according to claim 1, wherein the vehicle control unit can perform vehicle control based on the first control state in an operation condition range in which an upper limit operation value of the first operation condition range is not more than a first operation value and a lower limit operation value of the first operation condition range is not less than a second operation value, and
can perform vehicle control based on the second control state in an operation condition range in which an upper limit operation value of the second operation condition range is not more than a third operation value which is larger than the first operation value and a lower limit operation value of the second operation condition range is not less than a fourth operation value which is smaller than the first operation value and is larger than the second operation value.

4. The apparatus according to claim 3, wherein in an operation condition range between the fourth operation value and the first operation value which is an operation condition range in which the first operation condition range and the second operation condition range overlap, the vehicle control unit controls the vehicle by selecting, based on the setting, a control state prioritizing one of the first control state and the second control state.

5. The apparatus according to claim 1, wherein if the vehicle control unit determines that an operation value is less than the lower limit operation value of the overlapping operation condition range in the detection result in a case in which the second control state is to be prioritized in the overlapping operation condition range, the vehicle control unit shifts the control state of the vehicle from the second control state to the first control state.

6. The apparatus according to claim 1, wherein in a case in which the first operation condition range is a speed range in which an upper limit operation value is not more than a first speed and a lower limit operation value is not less than a second speed and
the second operation condition range is a speed range in which the upper limit operation value is not more than a third speed which is higher than the first speed and the lower limit operation value is not less than a fourth speed which is lower than the first speed and higher than the second speed,
the vehicle control unit changes a lower limit speed, which is the lower limit operation value of the second operation condition range, based on at least one piece of information among speed information of the vehicle, speed information of a peripheral vehicle positioned in a periphery of the vehicle, and speed information set to a road on which the vehicle is traveling.

7. The apparatus according to claim 6, wherein the vehicle control unit changes the lower limit speed, which is the lower limit operation value of the second operation condition range, based on an average value obtained from the speed information of the vehicle and the speed information of the peripheral vehicle which are detected by the detection unit.

8. The apparatus according to claim 6, wherein the vehicle control unit changes the lower limit speed, which is the lower limit operation value of the second operation condition range, based on the speed information set to the road which is detected by the detection unit.

9. The apparatus according to claim 1, further comprising:
a storage unit configured to store, as information indicating the setting of the driver, a lane change history corresponding to a route and the driver,
wherein the vehicle control unit controls the vehicle by selecting a control state by prioritizing one of the first control state and the second control state based on the lane change history.

10. The apparatus according to claim 1, wherein the vehicle control unit determines whether the adjacent lane is congested based on the detection result of the detection unit configured to detect a peripheral vehicle traveling on the adjacent lane, and
the vehicle control unit controls the vehicle by selecting, based on the setting of the driver and the result of the determination, a control state prioritizing one of the first control state and the second control state.

11. The apparatus according to claim 10, wherein in a case in which the vehicle control unit determines, based on the setting of the driver, that the second control state is to be prioritized in the overlapping operation condition range,
the vehicle control unit will prioritize the first control state if the adjacent lane is determined to be congested based on the result of the determination, and
the vehicle control unit will prioritize the second control state if the adjacent lane is not determined to be congested.

12. The apparatus according to claim 3, the plurality of control states include a third control state in which vehicle control can be performed in the travel lane of the vehicle in a third operation condition range in which a fifth operation value equal to the third operation value is set as the upper limit and a sixth value equal to the second operation value is set as the lower limit,
the first control state is a control state which has a higher automation rate of vehicle control or has a smaller degree of vehicle operation participation requested to the driver than the second control state, and
the third control state is control state which has an automation rate of vehicle control equal to the automation rate of vehicle control of the second control state, and the third control state is a control state in which vehicle control can be performed in the travel lane of the vehicle in the third operation condition range for operating the vehicle control.

13. The apparatus according to claim 12, wherein in a case in which the first control state and the third control state can be executed in an operation condition range in which the first operation condition range and the third operation condition range overlap,
the vehicle control unit controls the vehicle by selecting a control state prioritizing the first control state.

14. The apparatus according to claim 12, wherein in a case in which the first control state is to be prioritized in the overlapping operation condition range, the vehicle control unit shifts the control state of the vehicle from the first control state to the third control state when the vehicle control unit determines, based on the detection result, that an operation value has exceeded the upper limit operation value of the overlapping operation condition range, and
the vehicle control unit shifts the control state of the vehicle from the third control state to the first control state again when the operation value has become not more than the upper limit operation value after the shift.

15. The apparatus according to claim 12, wherein in a case in which the second control state and the third control state can be executed in an operation condition range in which the second operation condition range and the third operation condition range overlap,
the vehicle control unit control the vehicle by selecting, based on the setting of the driver, a control state prioritizing one of the second control state and the third control state.

16. The apparatus according to claim 2, wherein in a case in which the setting unit has not set the lane change request, the vehicle control unit controls the vehicle by prioritizing the first control state.

17. The apparatus according to claim 1, further comprising:
a storage unit configured to store, as information indicating the setting of the driver, a lane change frequency corresponding to a route and the driver,
wherein the vehicle control unit controls the vehicle by selecting, based on the lane change frequency, a control state prioritizing one of the first control state and the second control state.

18. A vehicle that can travel based on control by a vehicle control apparatus, comprising:
the vehicle control apparatus defined in claim 1.

19. A vehicle control apparatus that controls a vehicle based on a plurality of control states, comprising:
a detection unit configured to detect information of the vehicle and peripheral information of the vehicle; and
a vehicle control unit configured to control the vehicle based on the detection result of the detection unit,
wherein in a case in which the vehicle control unit can execute, based on the detection result of the detection unit,
a first control state in which vehicle control can be performed in a travel lane of the vehicle in a first operation condition range for operating vehicle control, wherein the first operation condition range is a speed range in which an upper limit operation value is not more than a first speed and a lower limit operation value is not less than a second speed and
a second control state in which vehicle control can be performed in the travel lane and vehicle control to make a lane change from the travel lane to an adjacent lane can be performed in a second operation condition range whose operation condition range partially overlaps the first operation condition range, wherein the second operation condition range is a speed range in which the upper limit operation value is not more than a third speed which is higher than the first speed and the lower limit operation value is not less than a fourth speed which is lower than the first speed and higher than the second speed,
the vehicle control unit controls the vehicle by selecting, based on a driving state of the vehicle, a control state prioritizing one of the first control state and the second control state in the overlapping operation condition range from the fourth speed to the first speed.

20. The apparatus according to claim 19, wherein in a case in which, in the driving state of the vehicle, an operation value shifts from a lower limit side, which has a smaller operation value than a lower limit operation value of the overlapping operation condition range, to the operation condition range, the vehicle control unit controls the vehicle by selecting the first controls state as a prioritized control state, and
in a case in which, in the driving state of the vehicle, the operation value shifts from an upper limit side, which has a larger operation value than an upper limit operation value of the overlapping operation condition range, to the operation condition range, the vehicle control unit controls the vehicle by selecting the second control state as the prioritized control state.

21. A vehicle that can travel based on control by a vehicle control apparatus, comprising:
the vehicle control apparatus defined in claim 19.

22. A vehicle control method of a vehicle control apparatus that controls a vehicle based on a plurality of control states, the method comprising:
   detecting, by a detection unit, information of the vehicle and peripheral information of the vehicle; and
   controlling the vehicle based on a detection result of the detection,
   wherein in a case in which it is possible to execute, in the controlling, based on the detection result in the detecting,
   a first control state in which vehicle control can be performed in a travel lane of the vehicle in a first operation condition range for operating vehicle control, wherein the first operation condition range is a speed range in which an upper limit operation value is not more than a first speed and a lower limit operation value is not less than a second speed and
   a second control state in which vehicle control can be performed in the travel lane and vehicle control to make a lane change from the travel lane to an adjacent lane can be performed in a second operation condition range whose operation condition range partially overlaps the first operation condition range, wherein the second operation condition range is a speed range in which the upper limit operation value is not more than a third speed which is higher than the first speed and the lower limit operation value is not less than a fourth speed which is lower than the first speed and higher than the second speed,
   the vehicle is controlled by selecting, based on a setting of the driver, a control state prioritizing one of the first control state and the second control state in the overlapping operation condition range from the fourth speed to the first speed.

23. A vehicle control method of a vehicle control apparatus that controls a vehicle based on a plurality of control states, the method comprising:
   detecting, by a detection unit, information of the vehicle and peripheral information of the vehicle; and
   controlling the vehicle based on the detection result of the detection unit,
   wherein in a case in which it is possible to execute, in the controlling, based on the detection result in the detecting,
   a first control state in which vehicle control can be performed in a travel lane of the vehicle in a first operation condition range for operating vehicle control, wherein the first operation condition range is a speed range in which an upper limit operation value is not more than a first speed and a lower limit operation value is not less than a second speed and
   a second control state in which vehicle control can be performed in the travel lane and vehicle control to make a lane change from the travel lane to an adjacent lane can be performed in a second operation condition range whose operation condition range partially overlaps the first operation condition range, wherein the second operation condition range is a speed range in which the upper limit operation value is not more than a third speed which is higher than the first speed and the lower limit operation value is not less than a fourth speed which is lower than the first speed and higher than the second speed,
   the vehicle is controlled by selecting, based on a driving state of the vehicle, a control state prioritizing one of the first control state and the second control state in the overlapping operation condition range from the fourth speed to the first speed.

24. A storage medium storing a program that causes a computer to execute each step of a vehicle control method defined in claim 22.

25. A storage medium storing a program that causes a computer to execute each step of a vehicle control method defined in claim 23.

* * * * *